US008615558B2

(12) United States Patent
Fukuzato

(10) Patent No.: US 8,615,558 B2
(45) Date of Patent: Dec. 24, 2013

(54) E-MAIL RECEPTION CONTROL SYSTEM, E-MAIL RECEPTION CONTROL METHOD, MOBILE TERMINAL AND STORAGE MEDIUM

(75) Inventor: Atsushi Fukuzato, Tokyo (JP)

(73) Assignee: NEC Corporation, Tokyo (JP)

( * ) Notice: Subject to any disclaimer, the term of this patent is extended or adjusted under 35 U.S.C. 154(b) by 90 days.

(21) Appl. No.: 13/120,795

(22) PCT Filed: Nov. 16, 2009

(86) PCT No.: PCT/JP2009/069673
§ 371 (c)(1),
(2), (4) Date: Mar. 24, 2011

(87) PCT Pub. No.: WO2010/061783
PCT Pub. Date: Jun. 3, 2010

(65) Prior Publication Data
US 2011/0219092 A1 Sep. 8, 2011

(30) Foreign Application Priority Data
Nov. 25, 2008 (JP) .................................. 2008-299678

(51) Int. Cl.
*G06F 15/16* (2006.01)
(52) U.S. Cl.
USPC ........ 709/206; 709/208; 709/226; 455/404.2; 455/406; 455/432.1; 455/436; 370/331
(58) Field of Classification Search
USPC ................. 709/206, 208, 223, 226; 370/331; 455/404.2, 406, 432.1, 436
See application file for complete search history.

(56) References Cited

U.S. PATENT DOCUMENTS

| 6,865,671 | B1 | 3/2005 | Assmann | |
|---|---|---|---|---|
| 7,136,915 | B2 * | 11/2006 | Rieger, III | 709/223 |
| 7,991,425 | B2 * | 8/2011 | Su et al. | 455/550.1 |
| 8,086,672 | B2 * | 12/2011 | Horvitz | 709/206 |
| 8,135,779 | B2 * | 3/2012 | Rainisto | 709/206 |
| 2005/0124338 | A1 * | 6/2005 | Benco et al. | 455/432.1 |
| 2005/0186974 | A1 | 8/2005 | Cai | |
| 2006/0031318 | A1 * | 2/2006 | Gellens | 709/206 |

(Continued)

FOREIGN PATENT DOCUMENTS

| CN | 1846412 A | 10/2006 |
|---|---|---|
| EP | 1063821 A2 | 12/2000 |

(Continued)

OTHER PUBLICATIONS

International Search Report for PCT/JP2009/069673 mailed Feb. 16, 2010.

(Continued)

*Primary Examiner* — Andrew Chriss
*Assistant Examiner* — Rasha Fayed

(57) ABSTRACT

An e-mail reception control system is provided for improving a convenience during international roaming and reducing unnecessary communication charges. The e-mail reception control system includes an e-mail reception control system including a mobile terminal which transmits filter information which is set in an own terminal and is referred to for determining whether to permit or reject a reception of an e-mail to a server in response to detecting international roaming and a server which controls a distribution of the e-mail to the mobile terminal based on the filter information.

26 Claims, 12 Drawing Sheets

(56) References Cited

U.S. PATENT DOCUMENTS

| | | | |
|---|---|---|---|
| 2006/0036698 A1* | 2/2006 | Hebert et al. | 709/206 |
| 2006/0053203 A1* | 3/2006 | Mijatovic | 709/206 |
| 2006/0168059 A1* | 7/2006 | Chang et al. | 709/206 |
| 2007/0021113 A1* | 1/2007 | Hamasaki et al. | 455/422.1 |
| 2007/0064649 A1* | 3/2007 | Makela et al. | 370/331 |
| 2007/0083606 A1* | 4/2007 | Malik et al. | 709/207 |
| 2007/0271346 A1* | 11/2007 | Vill | 709/206 |
| 2007/0282959 A1* | 12/2007 | Stern | 709/206 |
| 2008/0244070 A1* | 10/2008 | Kita et al. | 709/225 |
| 2008/0250106 A1* | 10/2008 | Rugg et al. | 709/206 |
| 2009/0181651 A1* | 7/2009 | Klassen | 455/414.1 |
| 2009/0186630 A1* | 7/2009 | Duff et al. | 455/456.3 |
| 2011/0189991 A1* | 8/2011 | Krause et al. | 455/432.1 |
| 2011/0219092 A1* | 9/2011 | Fukuzato | 709/206 |
| 2012/0077488 A1* | 3/2012 | Unger et al. | 455/432.1 |
| 2012/0300746 A1* | 11/2012 | Ibrahim et al. | 370/331 |

FOREIGN PATENT DOCUMENTS

| | | | |
|---|---|---|---|
| EP | 1657669 | A1 | 5/2006 |
| JP | 2004-328381 | A | 11/2004 |
| JP | 2004328381 | A | 11/2004 |
| JP | 2005-124015 | A | 5/2005 |
| JP | 2007221593 | A | 8/2007 |
| JP | 2008067274 | A | 3/2008 |
| WO | 2005124576 | A | 12/2005 |
| WO | 2007/072209 | A1 | 6/2007 |

OTHER PUBLICATIONS

European search report for EP09829031.5 dated Nov. 5, 2012.
Chinese Office Action for CN Application No. 200980147231.2 issued on May 2, 2013 with English Translation.
Japanese Office Action for JP Application No. 2010-540462 mailed on Aug. 6, 2013 with Partial English Translation.

* cited by examiner

E-MAIL RECEPTION CONTROL SYSTEM, E-MAIL RECEPTION CONTROL METHOD, MOBILE TERMINAL AND STORAGE MEDIUM

This application is the National Phase of PCT/JP2009/069673, filed Nov. 16, 2009, which claims priority based on Japanese Patent Application No. 2008-299678 filed on Nov. 25, 2008 and the disclosure of which is hereby incorporated in its entirety.

TECHNICAL FIELD

The present invention relates to a reception control of e-mails in a mobile terminal. In particular, it relates to an e-mail reception control system, an e-mail reception control method, a mobile terminal and a program.

BACKGROUND ART

In recent years, in an e-mail communication system of a mobile terminal such as a mobile phone, the seamless environment for an international use and a domestic use is in the process of being provided.

A number of users who use a mobile terminal which can provide international roaming service when such as traveling overseas, is increasing.

In response to increasing the mobile terminals which can provide international roaming service (international roaming terminals), the user who uses the international roaming terminals when such as traveling overseas is expanding. The usage fee of the packet communication when the mobile terminal is international roaming is usually set higher compared with the usage fee in domestic use.

By the way, the user of the international roaming terminal, in many cases, configures it to receive forwarded e-mails from a private personal computer or delivered e-mails relating to information of stores and the like when domestic use.

The Japanese Patent Application Laid-Open No. 2007-221593 discloses a reception control system which reduces the fees for forwarding from domestic to overseas in the case when the user roams out for overseas while using a call forwarding service.

The Japanese Patent Application Laid-Open No. 2008-67274 also discloses a message delivery system. The message delivery system forwards the e-mail in ease the e-mail sender's address is registered in the reception permission addresses and does not forward the e-mail in case the e-mail sender's address is registered in the reception rejection addresses corresponding to the e-mail destination address.

DISCLOSURE OF INVENTION

Problem(S) to be Solved by the Invention

As described above, some users of the international roaming terminal sets it to receive forwarded e-mails from a private personal computer or delivered e-mails relating to information of stores and the like when domestic uses. In this case, if the user forgets to set an e-mail reception filter for, for example, rejecting a reception of an e-mail to a server in advance when domestic use, it receives a large-volume of e-mail or a large number of e-mails unintentionally during overseas traveling. In this way, there is a problem that the high usage fee of the packet communication is charged to the user. The Japanese Patent Application Laid-Open No. 2007-221593 and the Japanese Patent Application Laid-Open No. 2008-67274 each discloses an apparatus which controls so as not to receive predetermined e-mails. In these apparatuses, there is a problem that the user has to set, in advance, addresses from which the user will not receive e-mails to a server.

An object of the present invention is to provide an e-mail reception control system, an e-mail reception control method, a mobile terminal and a program which can improve the convenience during international roaming and reduce unnecessary communication charges.

Means for Solving the Problems

A first e-mail reception control system includes a mobile terminal which transmits filter information which is set in an own terminal and is referred to for determining whether to permit or reject a reception of an e-mail to a server in response to detecting international roaming and a server which controls a distribution of the e-mail to the mobile terminal based on the filter information.

A first mobile terminal includes wireless transmission and reception means for detecting that it is under international roaming and control means for transmitting filter information which is set in an own terminal and is referred to for determining whether to permit or reject a reception of an e-mail to a server in response to be detected under international roaming by the wireless transmission and reception means.

A first e-mail reception control method includes setting, to a mobile terminal, filter information which is referred to for determining whether to permit or reject a reception of an e-mail, and detecting international roaming by the mobile terminal and controlling a distribution of the e-mail to the mobile terminal based on the filter information in response to detecting international roaming.

A first storage medium characterized by storing a program causing a computer to perform a process that detects that an own mobile terminal is under international roaming and a process that transmits filter information which is set in the own terminal and is referred to for determining whether to permit or reject a reception of an e-mail to a server in response to detecting international roaming.

A first e-mail reception control method includes detecting that an own mobile terminal is under international roaming and transmitting filter information which is set to the own terminal and is referred to for determining whether to permit or reject a reception of an e-mail in response to detecting international roaming.

The Effect of the Invention

According to the present invention, an effect in which the occurrence of the unintentional high fees caused by delivered e-mails and the like can be prevented and the reduction of unnecessary communication fees can be achieved even if the user does not set for, for example, a permission or a rejection of a reception of an e-mail in advance during international roaming can be obtained.

DESCRIPTION OF SYMBOLS

Figure 1A:
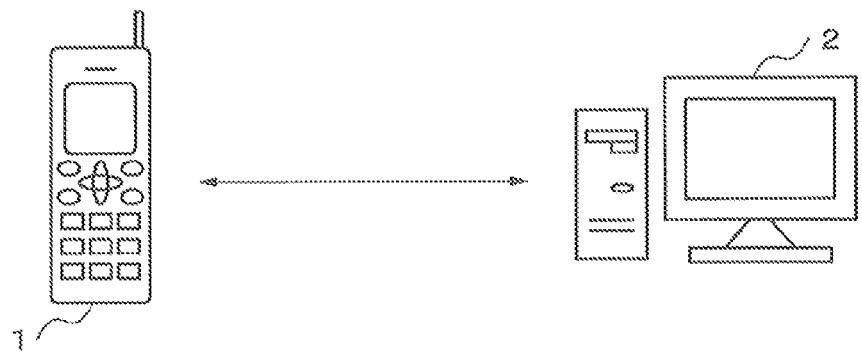
FIG. 1A shows a configuration of the e-mail reception control system according to the first embodiment of the present invention.

1 mobile terminal
2 server
3 base station
11,21 memory unit
12 wireless transmission and reception unit
13,23 input operation unit
14,24 display unit
22 network interface unit
16,25 control unit

BEST MODE FOR CARRYING OUT THE INVENTION

The First Embodiment

The first embodiment of the e-mail reception control system, the e-mail reception control method, the mobile terminal and the program according to the present invention will be described herein below.

Figure 1B:
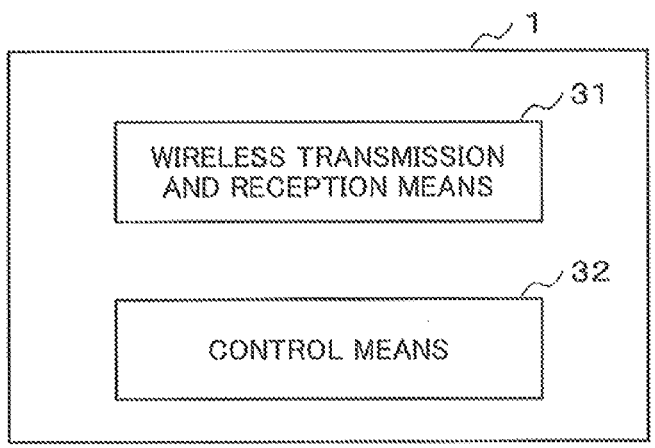
FIG. 1B is a block diagram showing a configuration of the mobile terminal according to the first embodiment of the present invention.
Figure 1C:
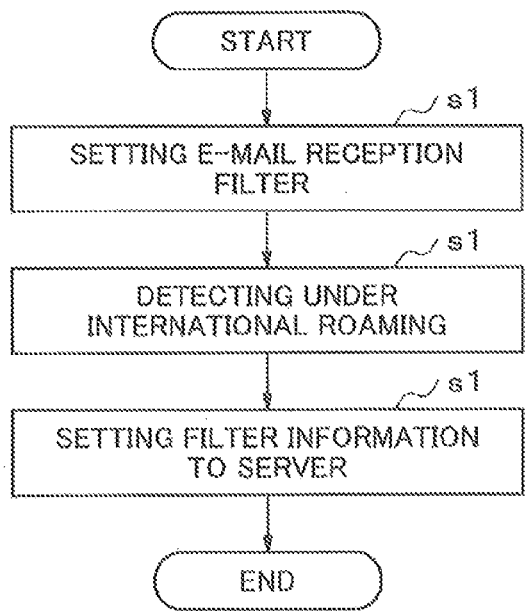
FIG. 1C is a flowchart showing the e-mail reception control method according to the first embodiment of the present invention.

FIG. 1A shows a configuration of the e-mail reception control system according to the first embodiment of the present invention. FIG. 1B is a block diagram showing a configuration of the mobile terminal according to the first embodiment. FIG. 1C is a flowchart showing the e-mail reception control method according to the first embodiment.

The e-mail reception control system of this embodiment includes a mobile terminal 1 and a server 2. The mobile terminal 1 transmits filter information to a server. The filter information is set in itself and is referred to for deciding whether to permit or reject a reception of an e-mail in response to detecting international roaming. The server 2 controls a distribution of the e-mail to the mobile terminal 1 based on the filter information.

The mobile terminal 1 of this embodiment includes a wireless transmission and reception means 31 and a control means 32. The wireless transmission and reception means 31 detects the mobile terminal 1 is international roaming. The control means 32 transmits the filter information which is set in itself and is referred to for deciding whether to permit or reject a reception of the e-mail to the server in response to international roaming is detected by the wireless transmission and reception means 31.

In the e-mail reception control method of this embodiment, the mobile terminal 1 sets the filter information which is referred to for deciding whether to permit or reject a reception of the e-mail and detects international roaming. The server 2 controls the distribution of the e-mail to the mobile terminal 1 based on the filter information.

By the above-mentioned configuration, according to the first embodiment, the effect in which the occurrence of the unintentional high fees caused by delivered e-mails or the like when international roaming can be prevented and the reduction of unnecessary communication fees can be achieved even if the user does not set for, for example, a permission or a rejection of a reception of the e-mail in advance can be obtained.

The second embodiment

Next, the e-mail reception control system, the e-mail reception control method, the mobile terminal and the program according to the second embodiment of the present invention will be described will be described herein below.

(Description of a Configuration)

Figure 2:
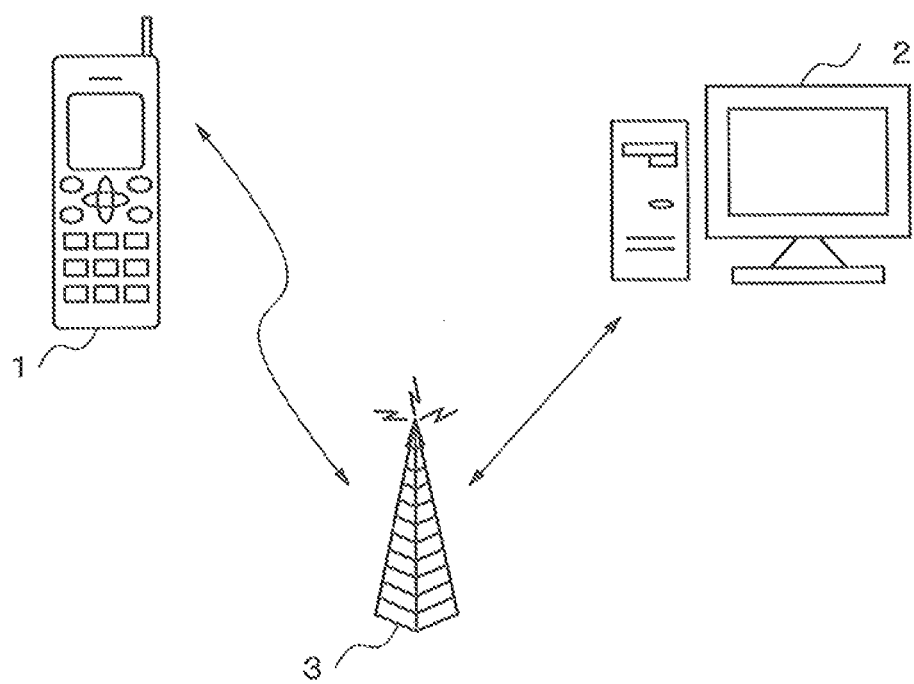
FIG. 2 shows an entire structure of an e-mail reception control system according to the second embodiment of the present invention.

FIG. 2 shows the entire structure of the e-mail reception control system according to the second embodiment of the present invention. This e-mail reception control system includes the mobile terminal 1, the server 2 and a base station 3. The respective functions are as follows.

1) The Mobile Terminal 1

The mobile terminal 1 has a wide variety of e-mail functions such as to create, transmit or receive e-mails based on a user operation. The mobile terminal 1 also has a function to set an e-mail reception filter which sets whether to permit or reject receptions of each e-mail or all e-mails to the terminal based on the user operation. For example, the mobile terminal 1 has a function to set the e-mail reception filter by using to the list of the e-mail sender's addresses as the filter information and a function to permit or reject the reception of the e-mail from the addresses included in the filter information.

The mobile terminal 1 also has a function to control regulations of such as delivered e-mails from the server by transmitting the filter information included in the e-mail reception filter setting which is previously set during, for example, international roaming or the filter information included in the e-mail reception filter setting which is newly set in itself to the server 2.

The mobile terminal 1 also has a function to control regulations of such as delivered e-mails from the server. By this function, when the mobile terminal 1 sets the e-mail reception filter based on the user operation during such as international roaming, the mobile terminal 1 transmits difference information (including deleted information) between the filter information included in the previously set e-mail reception filter and the newly set filter information to the server 2 as the filter information.

The mobile terminal 1 also has a function to add a destination address and the like included in such as a newly created e-mail by the user into the filter information of the e-mail reception filter setting of the mobile terminal 1. The mobile terminal 1 also has a function to set whether apply or not the filter function which regulates such as the above delivered e-mails to the serve.

Note that the mobile terminal 1 can be set to automatically transmit the filter information in response to data reception request (when Pull type data reception) and in response to e-mail data transmission (when Push type data transmission).

2) The Server 2

The server 2 is a server having an e-mail delivery functions, for example. The server 2 has a function to perform a Push type email delivery to such as the mobile terminal 1 and a function to perform a Pull type e-mail delivery by the mobile terminal 1. The server 2 also has a function to set or update the filter information by receiving the filter information which is received from mobile terminal 1, the difference information of the filter information, and the filter information (such as the destination information) added when receiving a new e-mail from the mobile terminal 1. The server 2 also has a function to perform a Push type e-mail delivery based on the set or updated filter information. The server 2 also has a function to regulate delivering e-mails and the like which delivers only necessary e-mails to the mobile terminals by using the filter information in response to Pull type reception request from the mobile terminal 1 based on the set or updated filter information.

3) The Base Station 3

The base station 3 is a general base station which connects a line between the mobile terminal 1 and the server 2 which controls transmission and reception of e-mails. The base station 3 is provided in a mobile phone network and has a function to perform wireless communication with mobile terminal 1. The base station 3 has a function to send and receive e-mails between the server 2 and the mobile terminal 1 via, for example, a radio network controller (RNC) and a packet switch in a mobile phone network.

Figure 3A:
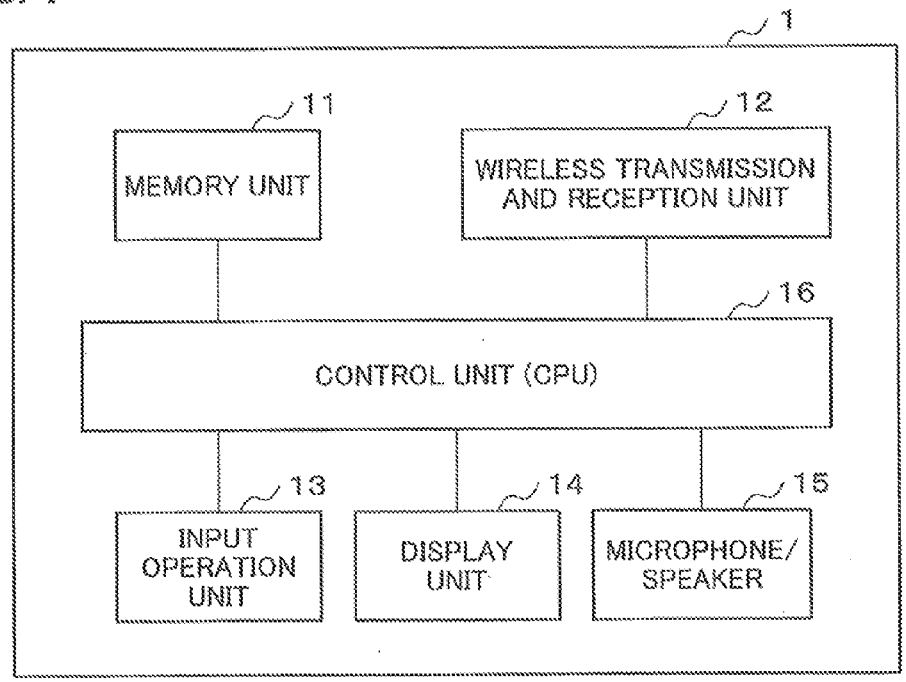
FIG. 3A is a block diagram showing a configuration of the mobile terminal according to the second embodiment of the present invention.
Figure 3B:
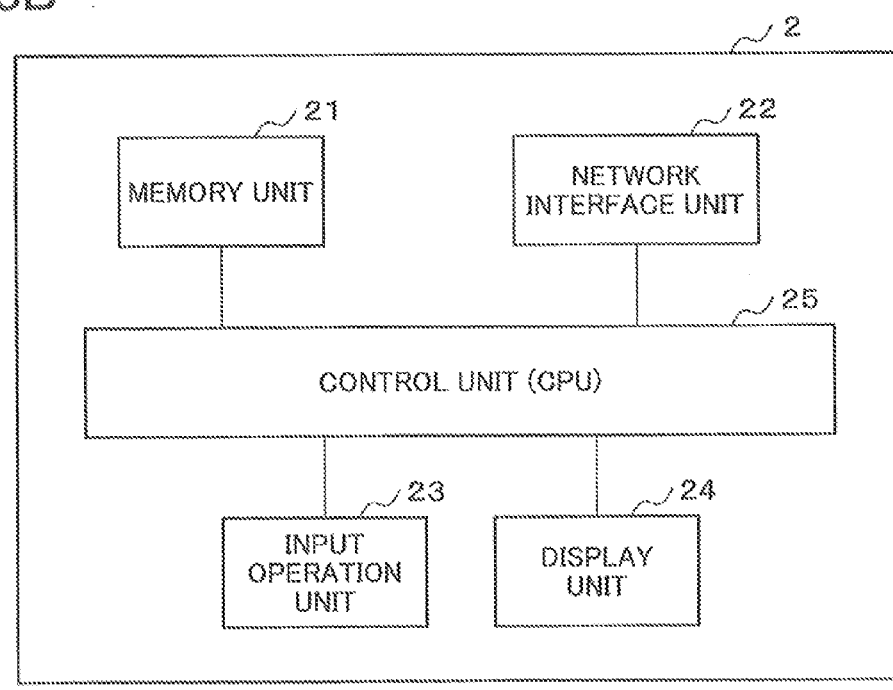
FIG. 3B is a block diagram showing a configuration of a server according to the second embodiment of the present invention.

FIG. 3A is a block diagram showing a configuration of mobile terminal 1. FIG. 3B is a block diagram showing a configuration of the server 2.

The mobile terminal 1 of this embodiment, as shown in FIG. 3A, includes a memory unit 11, a wireless transmission and reception unit 12, an input operation unit 13, a display unit 14, a microphone/speaker 15 and a control unit (CPU: Central Processing Unit) 16. The memory unit 11 includes, for example, a ROM (Read Only Memory) and a RAM to (Random Access Memory). The wireless transmission and reception unit 12 performs telephone communications via wireless communication with the base station 3 and performs data communications such as e-mails with the server 2. The wireless transmission and reception unit 12 detects whether under international roaming or not based on the information derived from the communication between the base station and the mobile terminal 1 because it communicates with the base station which controls a communication area while it performs a wireless communication. The input operation unit 13 receives operations to the above e-mail functions and the like from the user. The display unit 14 performs various indications about the mobile terminal 1. The microphone/speaker 15 performs input and output of voice for transmitting speech. The control unit 16 controls each part.

Memories such as a RAM included in the memory unit 11 store the filter information and the like about the e-mail reception filter setting which relates to the above e-mail functions and the like. Memories such as a ROM store programs for controlling the functions of the terminal such as the e-mail functions and the like. The control unit 16 reads the program codes stored in the memory unit 11 and is controlled by the read programs. The control unit 16 executes the above e-mail functions by controlling each part based on the input information from the input operation unit 13 and the filter information and the like.

The server 2 of this embodiment, as shown in FIG. 3B, includes a memory unit 21, a network interface unit 22, an input operation unit 23, a display unit 24 and a control unit 25. The memory unit 21 includes a ROM, a RAM, a hard disk and the like. The network interface unit 22 performs data communications with the base station 3, the internet and the like. The input operation unit 23 receives operations to the above e-mail functions from the user. The display unit 24 performs various indications of the e-mail functions and the like. The control unit 25 controls each part.

The memory unit 21 stores, for example, the filter information which is based on the e-mail reception filter setting relating to the above e-mail functions of the mobile terminal 1 and the like. The memory unit 21 stores programs for controlling transfer to the mobile terminal 1 including filtering processes of e-mails to the mobile terminal 1 which is performed based on the filter information.

The control unit 26 reads program codes stored in the memory unit 21 and controls each part based on the read programs.

Figure 4:
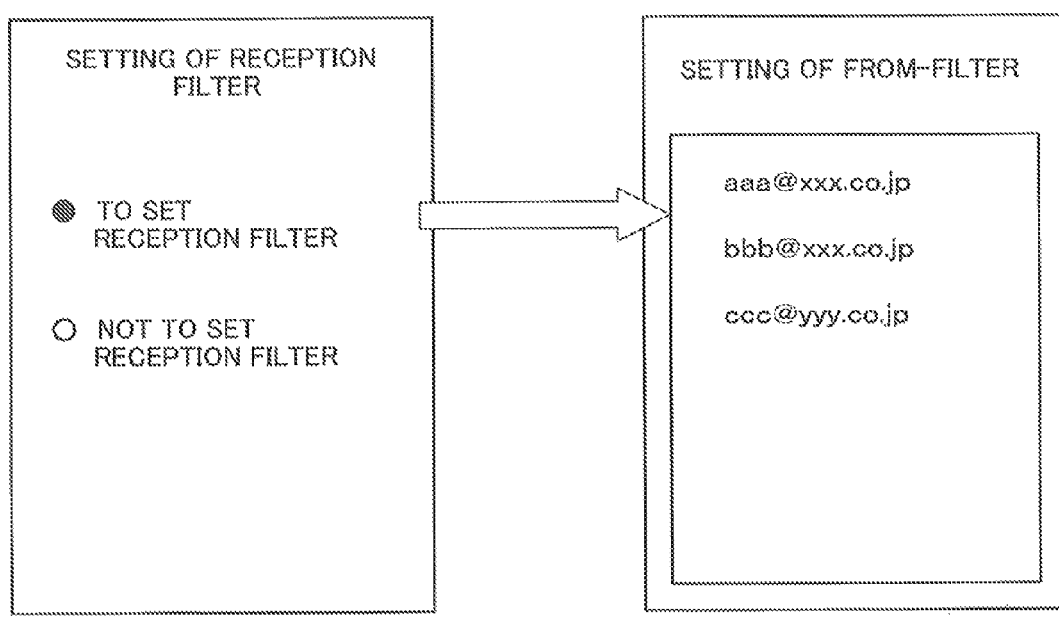
FIG. 4 is a diagram showing a setting screen of a reception filter in a mobile terminal according to the second embodiment.

FIG. 4 shows a setting screen for the e-mail reception filter setting in the mobile terminal 1. The mobile terminal 1 displays "the reception filter setting" screen as a selection menu screen on the display unit 14 in response to activating the e-mail reception filter setting function according to the operation of the input operation unit 13 of the mobile terminal 1 by the user.

The user, in this embodiment, can select "to set reception filter" or "not to set reception filter" (on/off setting of the e-mail reception filter setting) through the reception filter setting screen.

In "the reception filter setting" shown in FIG. 4, the mobile terminal 1 displays a "FROM-FILTER setting" screen on the display unit 14 in response to selecting, for example, "to set reception filter" by the user. The "FROM-FILTER setting" screen is a screen which is used for editing the FROM-FILTER information. In this case, a list of sender's addresses (reception rejection list) from which incomings (receptions) are rejected is registered in the FROM-FILTER information. For example, "aaa@xxx.co.jp", "bbb@xxx.co.jp" and "ccc@yyy.co.jp" are registered as the FROM-FILTER information. The FROM-FILTER information can be changed or edited appropriately through the operation of the input operation unit 13 by the user.

Note that the server 2 may be set to permit receptions from only addresses included in the FROM-FILTER information. Further, the server 2 may be set to receive e-mails similarly in domestic use during international roaming in case "not to set reception filter" is selected.

The mobile terminal 1 sets the e-mail reception filter to the server 2 by transmitting the filter information to the server 2 when it sends or receives e-mails, or updates the reception filter and the like.

(Description of Operation)

Next, an operation of the second embodiment of the present invention will be described herein below.

Figure 5:
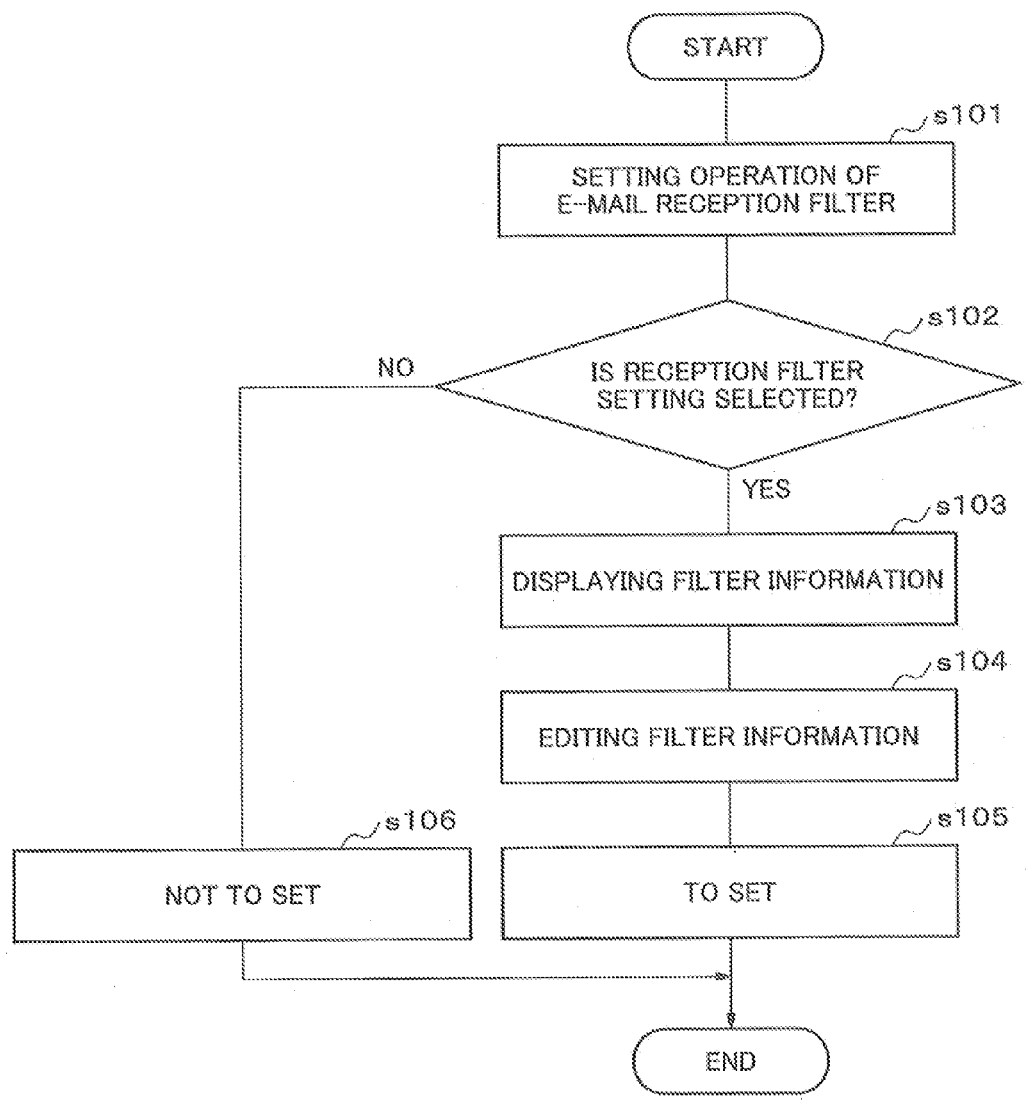
FIG. 5 is a flowchart showing a process of setting an e-mail reception filter in a mobile terminal according to the second embodiment.

FIG. 5 is a flowchart showing a process of setting the e-mail reception filter to mobile terminal 1. In this embodiment, it will be described the case when the filter information includes a list of sender's addresses (the reception rejection list) from which reception are rejected.

The mobile phone 1 displays the "reception filter setting" screen shown in FIG. 4 on the display unit 14 when the e-mail reception setting is activated by the operation of the input operation unit 13 of the mobile terminal 1 from the user (s101). The user selects either "to set reception filter" or "not to set reception filter".

When the user selects one of the above selections, the mobile terminal 1 detects whether "to set reception filter" was selected or not (s102). The mobile terminal 1 displays the "FROM-FILTER setting" screen in case "to set reception filter" is selected (s103). In this case, the list of sender's addresses that is set in advance to reject receptions is displayed as the filter information.

The user edit, including such as add and delete, one or more sender's address(es) by operating the input operation unit 13 (s104). The mobile terminal 1 sets the filter information to the terminal itself (s105). Note that the mobile terminal 1 may store the list of addresses for rejecting receptions as the filter information and may employ the changed part, that is, the difference information as the filter information when the filter information is edited.

When "not to set reception filter" is selected in step s102, the mobile terminal 1 terminates the process without setting the e-mail reception filter (s106).

By the above operations, the mobile terminal 1 sets the e-mail reception filter.

Next, an operation in which the mobile terminal 1 sets the e-mail reception filter to the server 2 will be described.

The mobile terminal 1 applies the filter information which is set or edited in advance during international roaming to the server 2 when it, for example, transmits or receives e-mails, or updates the e-mail reception filter. When the e-mail reception filter is not set, the mobile terminal 1 does not perform the above application to the server 2.

First, an operation of the e-mail reception filter setting when the server 2 receives e-mails to the mobile terminal 1 will be described.

Figure 6:
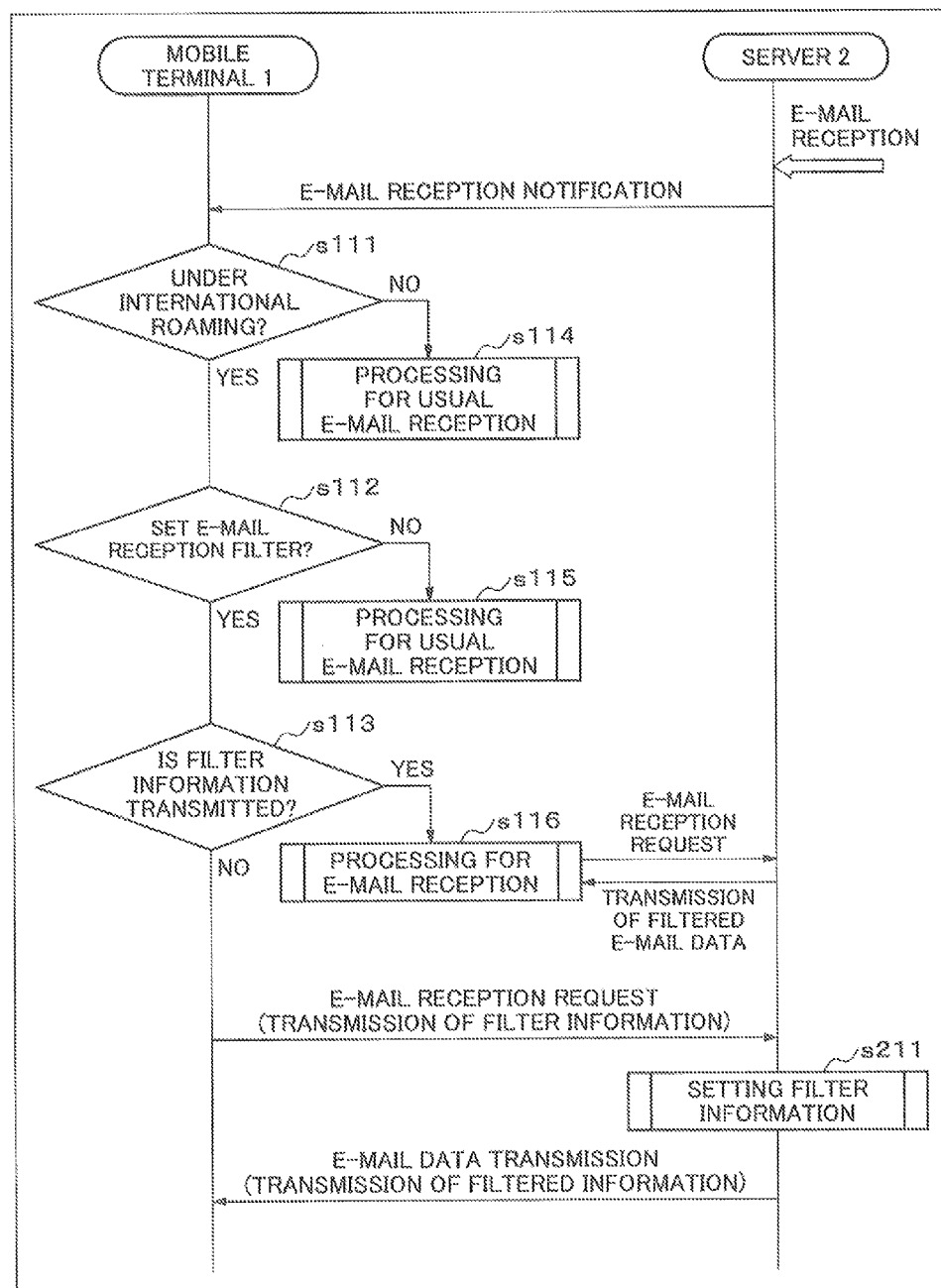
FIG. 6 is a flowchart showing a process of an e-mail reception control system when a server according to the second embodiment receives an e-mail for a mobile terminal.

FIG. 6 is a flowchart showing a process of the e-mail reception control system when the server 2 receives an e-mail to the mobile terminal 1.

In case the server 2 receives an e-mail from outside and the e-mail is to be delivered to the mobile terminal 1 by a filtering function of the server 2, it gives an e-mail reception notification to the mobile terminal 1.

The mobile terminal 1 detects e-mail data for itself is on the server 2 in response to receiving the e-mail reception notification from the server 2. The mobile terminal 1 determines whether it is under international roaming or not (s111), and executes the process for the normal e-mail reception when it is not under international roaming (s114). That is, the mobile terminal 1 sends an e-mail reception request to the server 2 and receives e-mail data transmitted from the server 2. This is the usual Pull type reception process.

In case the mobile terminal 1 is under international roaming as a result of the determination of step sill, the mobile terminal 1 executes the process which includes the application of the reception filter (s111, Yes).

The mobile terminal 1 determines whether the e-mail reception filter is set or not, that is, whether the filter information is stored in the memory unit 11 or not (s112). When the filter information is not stored in the memory unit 11, (s112, No), the mobile terminal 1 performs the usual Pull type reception process of the e-mail data (s115).

As the result of the determination at step s112, when the e-mail reception filter is set (s112, Yes), the mobile terminal 1 determines whether the filter information has been transmitted or not (s113). The filter information may include a flag that indicates that it is transmitted already. When the filter information is already transmitted (s113, Yes), the mobile terminal 1 transmits an e-mail reception request to the server 2. The server 2 transmits the e-mail data which is filtered based on the filter information which is previously received to mobile terminal 1. The mobile terminal 1 receives the e-mail data which is filtered based on the above filter information (s116).

As the result of the determination of step s113, when the filter information has not been transmitted (s113, No), the mobile terminal 1 transmits an e-mail reception request which includes the filter information to the server 2. At that time, the mobile terminal 1 transmits the changed part (the difference information) which is the difference from the previously transmitted filter information to the server 2 as the filter information with an e-mail reception request. The server 2 sets the received filter information to itself (s211).

As well as setting the received filter information to itself, the server 2 transmits the e-mail data which is filtered based on the filter information to mobile terminal 1. The mobile terminal 1 receives the e-mail data which is filtered.

Note that in case the difference information does not exist when the e-mail reception request is sent, the mobile terminal 1 receives the e-mail which is filtered based on the filter information which is applied last time from the server 2.

Next, an operation of the e-mail reception control system, when the filter information is updated, will be described.

In case the mobile terminal 1 is under the international roaming and the filter information is updated, that is, the filter information includes the difference information when the user changes the filter information by selecting "to set reception filter" on "the reception filter setting" screen, the mobile terminal 1 transmits the difference information with the e-mail reception request. The server 2 updates the filter information by the received difference information. The mobile terminal 1 receives the e-mail data which is filtered from the server 2.

Figure 7:
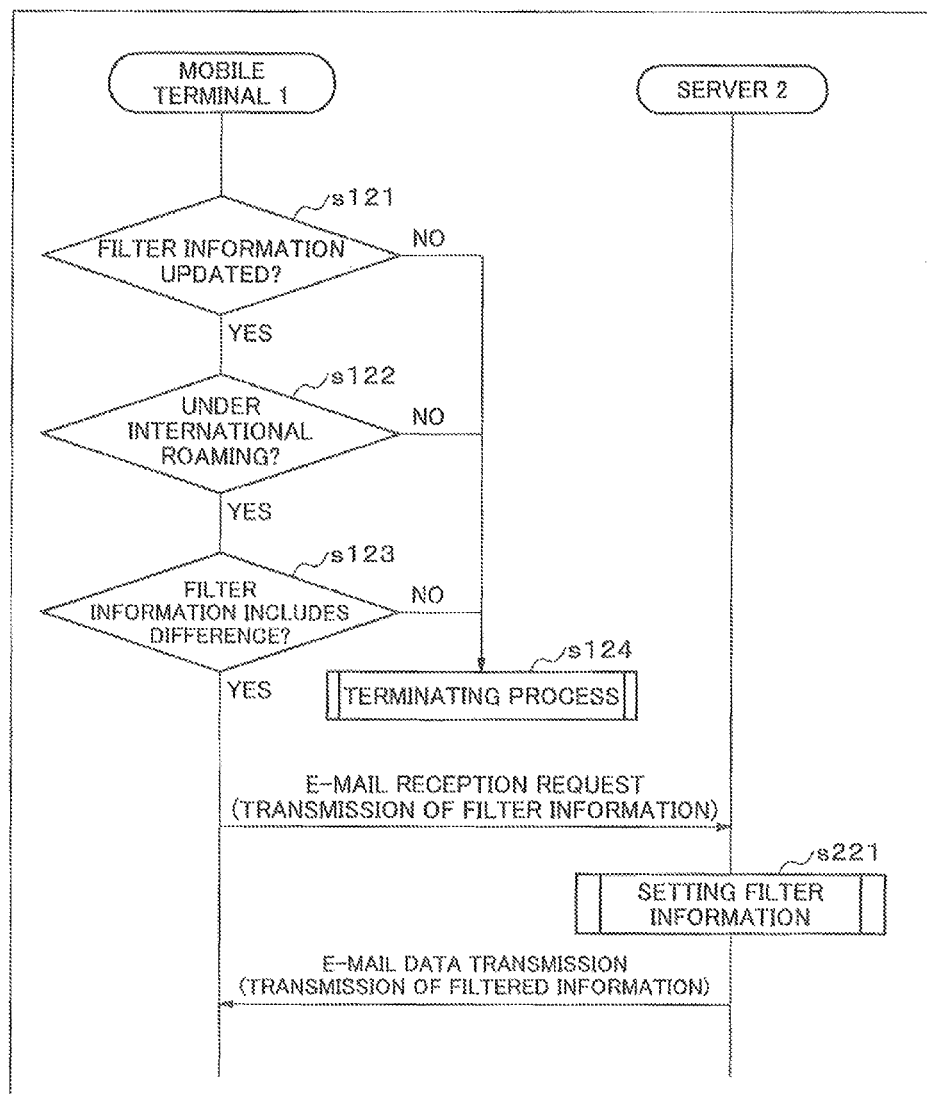
FIG. 7 is a flowchart showing an operation of an e-mail reception control system when filter information on a mobile terminal is updated.

FIG. 7 is a flowchart showing an operation of the e-mail reception control system when the filter information on the mobile terminal 1 is updated. An operation of the mobile terminal 1 and the server 2 will be described in detail with reference to FIG. 7.

When the mobile terminal 1 detects the filter information is updated (s121, Yes), it determines whether it is under international roaming or not (s122). In case the mobile terminal 1 is under international roaming, the mobile terminal 1 determines whether the filter information includes the difference information or not (s123). The mobile terminal 1 may hold both the previous filter information and the filter information which is updated this time in memory unit 11 and may detect the changed part between them as the difference information. In case the filter information which is updated this time includes the difference information, the mobile terminal 1 transmits the difference information with the e-mail reception request to the server 2. The server 2 updates the e-mail reception filter setting using the received difference information (s221). In response to receiving an e-mail to the mobile terminal 1, the server 2 transmits the e-mail data which is filtered based on the updated filter information.

In case the filter information is not updated in step s121, in case the mobile terminal 1 is not under international roaming in s122, or in case the filter information does not include the difference information in s123, the mobile terminal 1 terminates the process (s124).

Next, an operation of the e-mail reception filter setting when the mobile terminal 1 transmits an e-mail will be described.

In response to creating an e-mail, the mobile terminal 1 checks the filter information of the e-mail reception filter setting and determines whether the destination address of the e-mail is included in the filter information. Note that the filter information includes an address list from which receptions are rejected. In case the destination address is included in the filter information as an address from which receptions are rejected, the mobile terminal 1 deletes the destination address from the filter information.

The mobile terminal 1 transmits the difference information to the server 2 by adding it to e-mails when the mobile terminal 1 transmits the e-mails. The server 2 updates the filter information based on the received difference information. As the result, the destination address is deleted from the filter information on the server 2 and the server 2 can deliver such as a replay e-mail from the address. Further, in case the filter information on the mobile terminal includes an address list from which receptions are permitted, the mobile terminal adds the destination address to the filter information.

Figure 8:
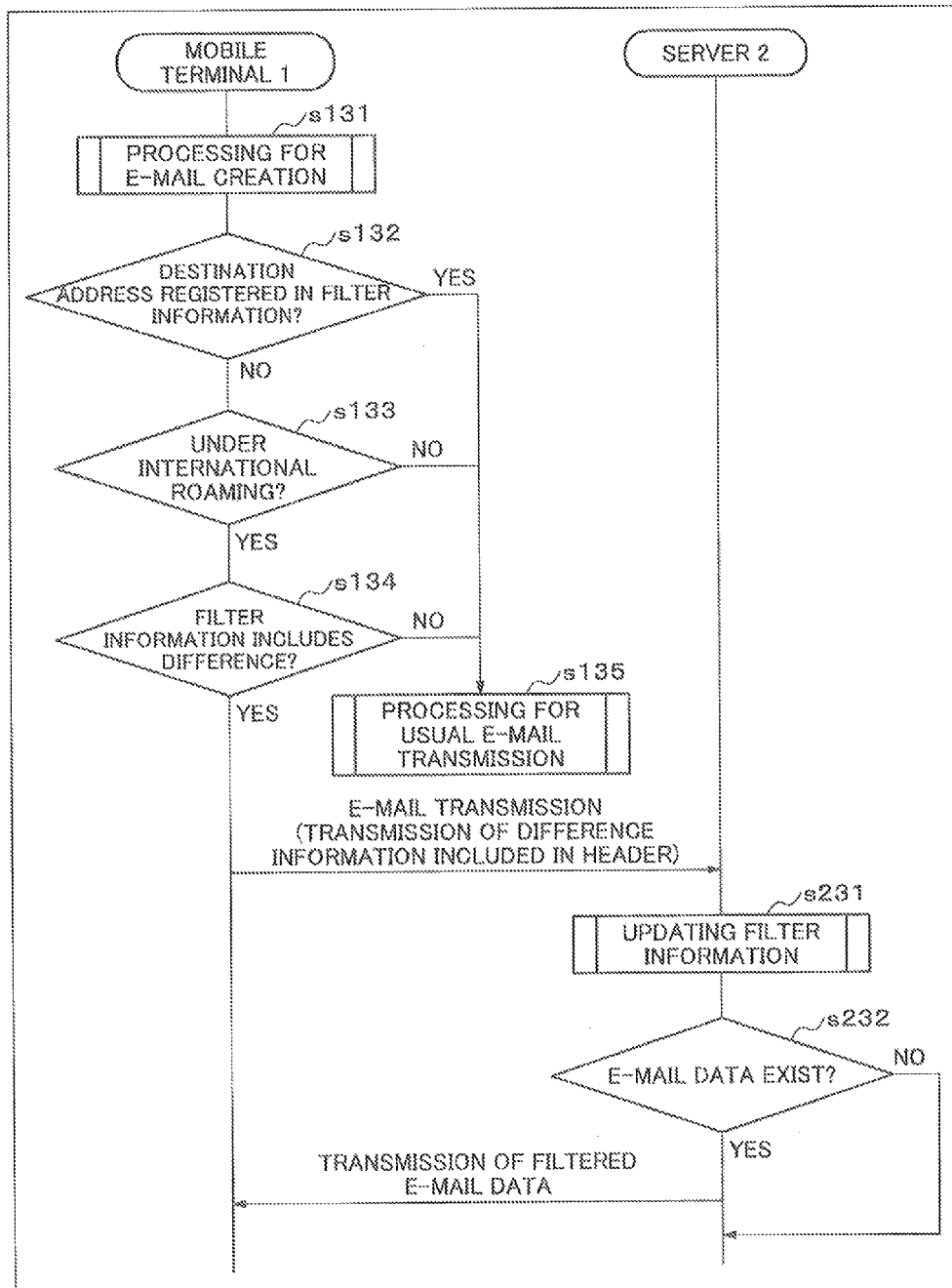
FIG. 8 is a flowchart showing a process of an e-mail reception control system when a mobile terminal transmits an e-mail.

FIG. 8 is a flowchart showing a process of the e-mail reception control system when the mobile terminal transmits an e-mail. The operations of the mobile terminal 1 and the server 2 will be described in detail with reference to FIG. 8. Here, the filter information of the e-mail reception filter setting of the mobile terminal includes a list of the reception permission addresses from which receptions are permitted.

In response to activating the e-mail function and creating a new e-mail by the user (s131), the mobile terminal 1 determines whether the destination address of the e-mail is registered in the filter information in the e-mail reception filter setting (s132). In case the destination address is not registered, the mobile terminal 1 registers the destination address to the filter information. Note that in case the filter information includes a list of addresses from which receptions are rejected, the mobile terminal 1 deletes the destination address from the filter information.

The mobile terminal 1 determines whether it is under international roaming or not (s133). In case the mobile terminal 1 is under international roaming, the mobile terminal 1 determines whether the filter information includes the difference information in accordance with the result of step s132 (s134). In case the filter information includes the difference information, the mobile terminal 1 includes the difference information into the e-mail header and the like as the filter information and transmits the e-mail to the server 2. The server 2 updates the e-mail reception filter setting in accordance with the received filter information (s231). In response to detecting e-mail data such as delivery e-mails (s232), the server 2 performs the filtering process to the e-mail data based on the updated filter information and transmits the e-mail data which is filtered to the mobile terminal 1.

In case the destination address is registered in the filter information in step s132, the mobile terminal 1 is not under international roaming in step s133, or the filter information does not includes the difference information in step s134, the mobile terminal 1 performs the usual e-mail transmission process (s135).

Next, an operation of the e-mail reception filter setting when a connection of the mobile terminal 1 returns to the domestic network from international roaming will be described.

The mobile terminal 1, in response to detecting that it connects to the domestic network, in case the mobile terminal 1 detects it was in international roaming previously and the e-mail reception filter is set in the server 2, transmits an e-mail reception request which includes a cancelling request for the e-mail reception filter setting to the server 2. The server 2 cancels the setting of the e-mail reception filter based on the cancelling request. Subsequently, when the server 2 receives e-mail data to the mobile terminal 1, it can forward it to the mobile terminal 1. By the above configuration, the mobile terminal 1 becomes able to receive e-mails automatically when the mobile terminal 1 returns its connection to the domestic network from international roaming.

Figure 9:
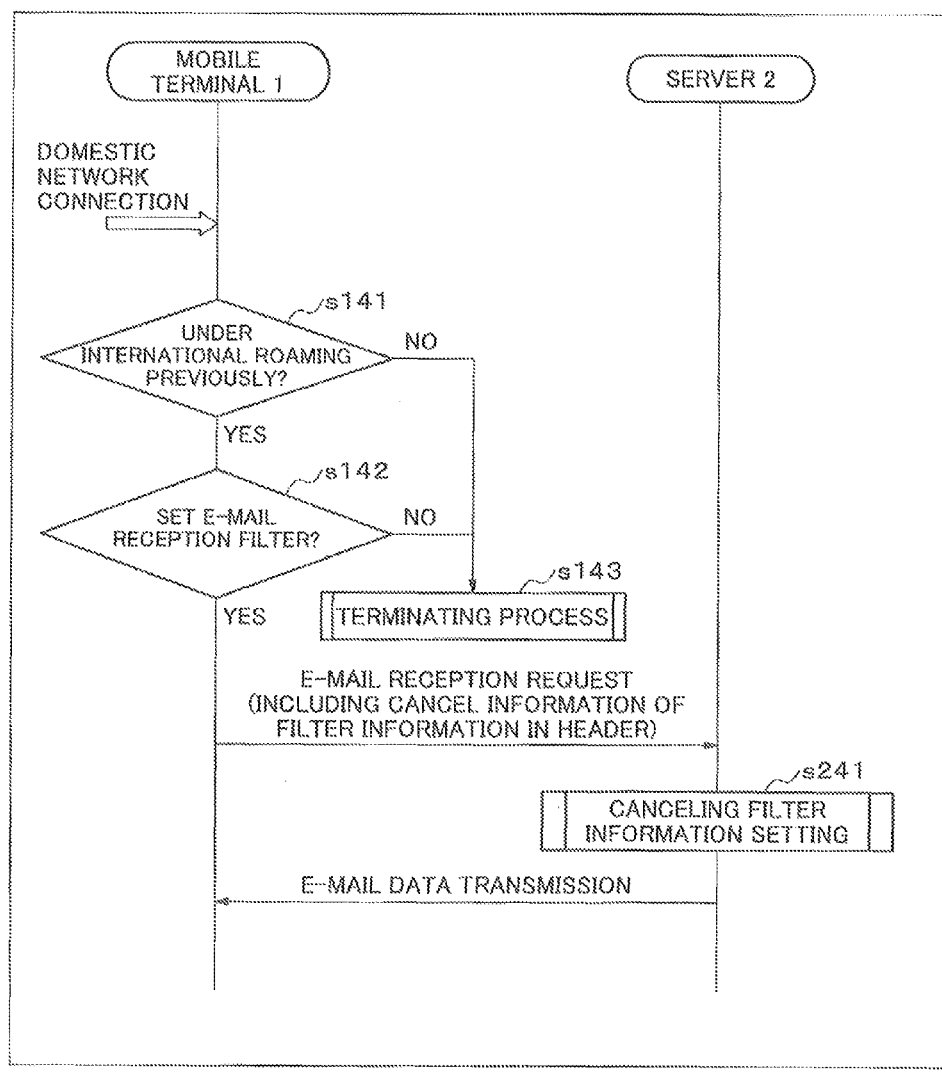
FIG. 9 is a flowchart showing a process of an e-mail reception control system when a connection of a mobile terminal returns to a domestic network from international roaming.

FIG. 9 is a flowchart showing a process of the e-mail reception control system when the connection of the mobile terminal 1 returns to the domestic network from international roaming.

The operations of the mobile terminal 1 and the server 2 will be described in detail with reference to FIG. 9.

The mobile terminal 1 determines whether it was under international roaming previously or not in response to connecting to the domestic network (s141). In case the mobile terminal 1 was under international roaming previously, the mobile terminal 1 determines whether the e-mail reception filter is set or not in the server 2 (s142). In case the e-mail reception filter is set, the mobile terminal 1 transmits an e-mail reception request which includes a cancelling request for the reception filter to the server 2.

The server 2 cancels the setting of the e-mail reception filter (s241) based on the cancelling request received from the mobile terminal 1. Subsequently, when the server 2 receives e-mail data to the mobile terminal 1, it can forward it to the mobile terminal 1.

In case the mobile terminal 1 was not under international roaming previously in step s141, or in case the e-mail reception filter is not set in step s142, the mobile terminal 1 terminates its process (s143).

As described above, according to the second embodiment, the mobile terminal 1, in case the e-mail reception filter is set when the mobile terminal 1 is during international roaming and the filter information is not transmitted to the server 2 when the mobile terminal 1 receives an e-mail, transmits the filter information with the e-mail reception request to the server. The server 2 sets the e-mail reception filter based on the received filter information. Further, the mobile terminal 1 performs the similar operation when the filter information is updated and when it transmits new e-mails. In case the mobile terminal 1 sets the e-mail reception filter to the server when the connection of the mobile terminal 1. returns to the domestic network from international roaming, the mobile terminal 1 transmits the cancelling request for the setting to the server 2. The server 2 cancels the setting of the e-mail reception filter based on the cancelling request. By the above configuration, in the e-mail reception control system, an effect in which the occurrence of the unintentional high fees caused by delivered e-mails and the like can be prevented and the reduction of unnecessary communication fees can be achieved even if the user does not set for, for example, a permission or a rejection of a reception of an e-mail in advance during international roaming can be obtained.

Further, the mobile terminal 1 can set the filter information that was already set in the local environment into the server automatically. By the configuration, the user can control reception regulations of, for example, delivery e-mails from the server automatically by simple input operations. Since the user is not required to access the server and to set the e-mail reception filter while the mobile terminal 1 is international roaming, it is possible to improve the usefulness of the mobile terminal 1 for the user the while the mobile terminal 1 is international roaming.

The Third Embodiment

In the above second embodiment, a configuration in which the user can select either "to set reception filter" or "not to set reception filter" regarding the e-mail reception filter setting of the mobile terminal 1 was described. In this embodiment, a configuration in which the user can also select "the reception rejection setting" to reject receptions of all e-mails when the user "set the reception filter" will be described.

Figure 10:
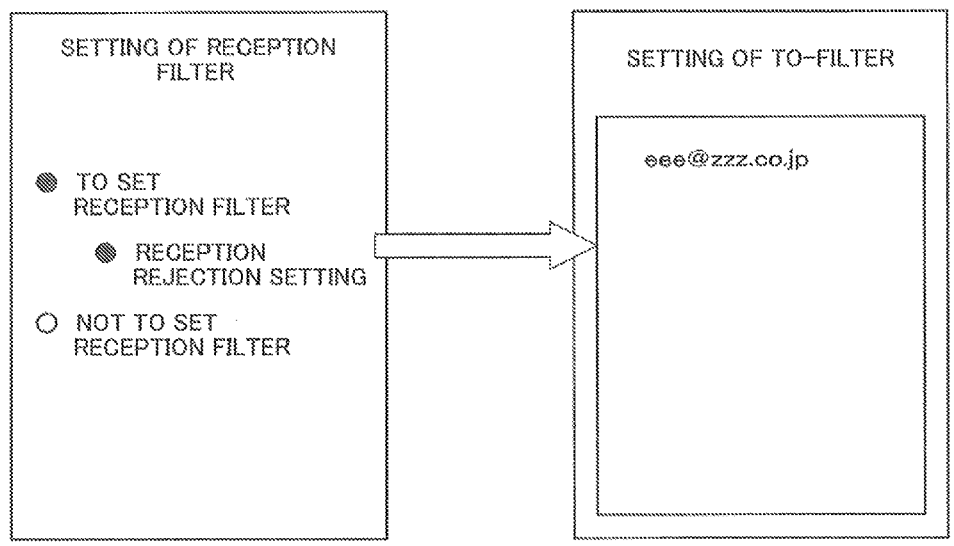
FIG. 10 is a diagram showing a setting screen of an e-mail reception filter in a mobile terminal according to the third embodiment.

FIG. 10 shows an e-mail reception filter setting screen according to the third embodiment.

The mobile terminal displays a choice indicating "the reception rejection setting" to reject receptions of all e-mails on the e-mail reception filter setting screen. The mobile terminal 1 displays a "TO-FILTER setting" screen on the display unit 14 when the user selects "the reception rejection setting". "TO-FILTER" is the filter information including the addresses to which transmissions of e-mails are rejected. The TO-FILTER may include the e-mail address of the mobile terminal 1.

Figure 11:
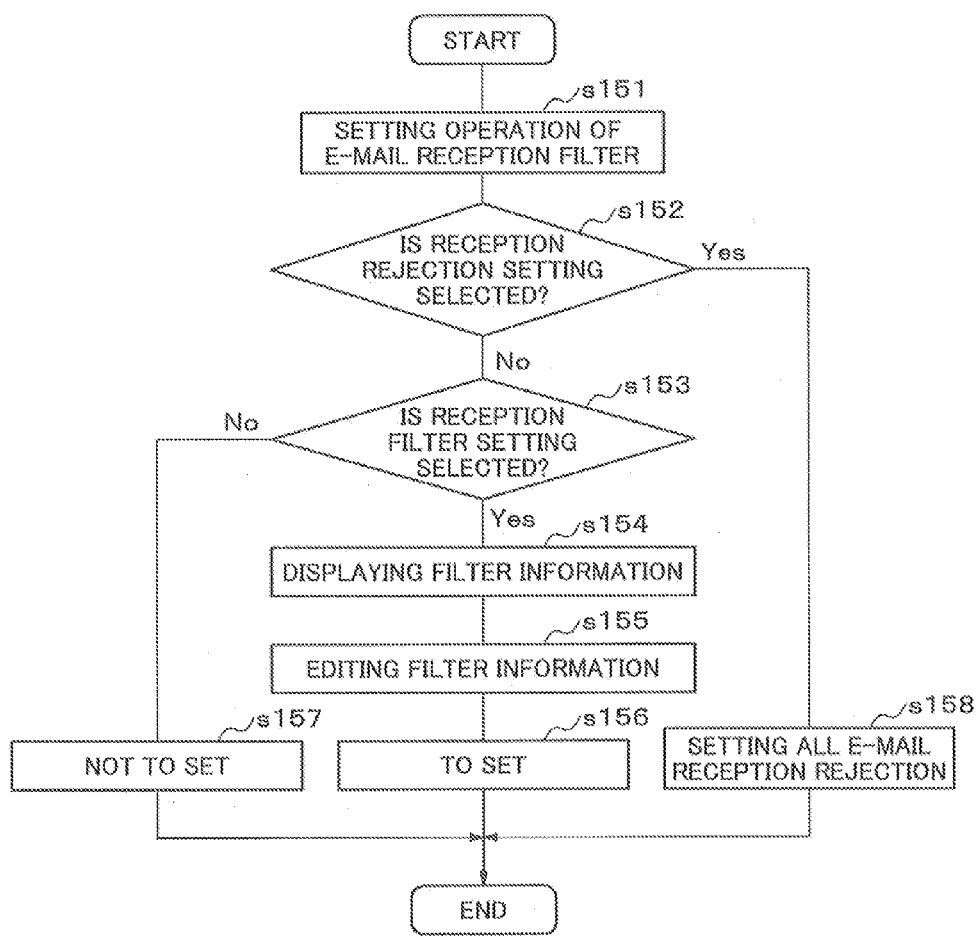
FIG. 11 is a flowchart showing a process of an e-mail reception filter setting in a mobile terminal according to the third embodiment.

FIG. 11 is a flowchart showing a process of the e-mail reception filter setting in the mobile terminal according to the third embodiment. The operation of the mobile terminal will be described with reference to the figure.

When the user performs the operation for the e-mail reception filter setting (s151), the mobile terminal 1 determines whether the user selected "the reception rejection setting" or not (s152). When "the reception rejection setting" is selected, the mobile terminal 1 sets the e-mail reception filter to reject receptions all e-mails (s158). When "the reception rejection setting" is not selected in step s152, the mobile terminal 1 determines whether "to set reception filter" is selected or not (s153).

Since steps s153-s157 of the flowchart are same as the processes of s102-s106 of the flowchart shown in FIG. 5 of the second embodiment, the detail description of the processes of each steps is omitted.

Figure 12:
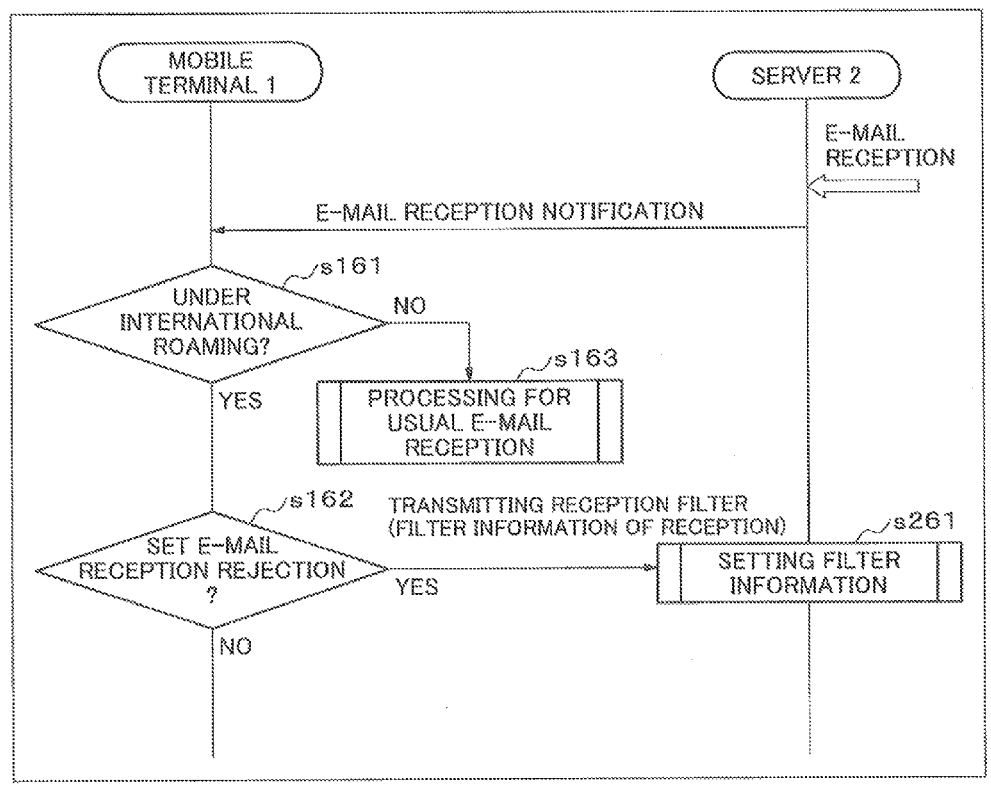
FIG. 12 is a flowchart showing a process of an e-mail reception control system according to the third embodiment.

FIG. 12 is a flowchart showing a process of the e-mail reception control system according to the third embodiment. The operation of the mobile terminal 1 and the server 2 will be described with reference to the figure.

The server 2, in case e-mails are to be delivered to the mobile terminal 1 by the filtering process of the e-mails when it receives the e-mail data from outside, gives an e-mail reception notification to the mobile terminal 1.

The mobile terminal 1 detects that e-mail data to itself is on the server 2 in accordance with the e-mail reception notification from the server 2. At that time, the mobile terminal 1 determines that it is under international roaming or not (s161), and executes the process for the normal e-mail reception when it is not under international roaming (s163). Note that the mobile terminal 1 transmits an e-mail reception request to the server 2 and receives the e-mail data transmitted from the server 2. This is the usual Pull type reception process.

In case the mobile terminal 1 is under international roaming as the result of the determination of step s161, the mobile terminal 1 executes the process which includes the application of the reception filter (s161, Yes).

That is, in case the information regarding the e-mail reception filter setting stored in the mobile terminal 1 is the reception rejection setting for rejecting receptions of all e-mails (s162, Yes), the mobile terminal 1 transmits the filter information for rejecting receptions of all e-mails to the server 2. In response to receiving the filter information for rejecting receptions from the mobile terminal 1, the server 2 executes the e-mail reception filter setting based on the filter information (s261). That is, the server 2 sets to itself not to transmit e-mail data to the mobile terminal 1 (s261). Subsequently, the server 2 will not transmit the e-mail data even if it receives e-mail data to the mobile terminal 1.

In case the information regarding the e-mail reception filter setting stored in the mobile terminal 1 is not the reception rejection setting as the result of the determination of step s162 (s162, No), the mobile terminal 1 execute the similar process as step s112 and after step s112 of FIG. 6 for determining whether the e-mail reception filter is set or not. Although it is explained that the mobile terminal 1 sets the e-mail reception filter using the list of sender's addresses (the reception rejection address list) from which receptions are rejected by the mobile terminal 1 in the above embodiment, the list of sender's addresses (a reception permission address list) can be used as the filter information.

The mobile terminal 1 transmits the difference information between the previously set filter information and the updated filter information to the server 2 as filter information in the above embodiment. By the configuration, the mobile terminal 1 can reduce the data volume for transmission. The mobile terminal 1 may transmit the updated filter information to the server in the form as it is.

Moreover, the information registered in the filter information is not limited to sender's addresses such as a FROM address, they may be information on the various header items such as Cc (Carbon Copy) addresses, and such as information of a subject and characters and the like in a main body.

As described above, the user can set the e-mail reception filter to ON or OFF in advance in the mobile terminal. The user can stop receiving e-mails that is not intended when the user sets the e-mail reception filter to ON. The mobile terminal transmits the reception rejection list (or the reception permission list) to the server as the filter information when the mobile terminal requests the Pull type e-mails receptions to the server, when the mobile terminal executes the Push type e-mails transmissions to the server. By the configuration, the mobile terminal can control so as not to or to execute delivery of e-mails from the server by registering the filter information to the server while the mobile terminal is international roaming.

Accordingly, according to the third embodiment, even if the setting by which the mobile terminal 1 rejects e-mails receptions during the mobile terminal 1 is international roaming is not executed, the e-mail reception control system can set the e-mail reception filter automatically. By this configuration, the e-mail reception control system can prevent the occurrence of the unintentional high fees and achieve the reduction of unnecessary communication fees.

Further, the e-mail reception control system can set the filter information which was set in the mobile terminal 1 previously in its local environment into the server automatically. By this configuration, the user can automatically control reception regulations of such as a delivery e-mail from the server with simple input operations. Accordingly, since the user is not required to access the server and to set the e-mail reception filter while the mobile terminal is international roaming, it is possible to improve the usefulness during international roaming.

The present invention has been described with reference to the exemplary embodiment. However, the present invention is not limited to the above-mentioned exemplary embodiment. Various changes in configuration and details of the present invention which can be understood by the person skilled in the art can be made within the scope of the present invention.

INDUSTRIAL APPLICABILITY

This invention can be applied to a mobile terminal capable of international roaming.

What is claimed is:

1. An e-mail reception control system, comprising:
   a mobile terminal capable of transmitting filter information, to a server, which is set in an own terminal and is referred to for determining whether to permit or reject a reception of an e-mail to the server in response to detecting international roaming; and
   the server which controls a distribution of the e-mail to the mobile terminal based on the filter information,
   wherein, in response to receiving an email reception notification from the server, the mobile terminal determines whether or not it is under the international roaming, and sends an email reception request to the server when it is not under the international roaming or request to apply the filter information to the server when it is under the international roaming,
   wherein the mobile terminal, in case a destination address of an e-mail is included in the filter information when transmitting the e-mail, deletes the destination address from the filter information and transmits the updated filter information to the server, and
   wherein the mobile terminal, in case a destination address of an e-mail is not included in the filter information when transmitting the e-mail, add the destination address to the filter information and transmits the updated filter information to the server.

2. The e-mail reception control system according to claim 1, wherein
   the mobile terminal transmits the filter information to the server in response to detecting the server receives an e-mail to the own terminal.

3. The e-mail reception control system according to claim 1, wherein
   the mobile terminal transmits the filter information to the server when the filter information is updated.

4. The e-mail reception control system according to claim 1, wherein
   in case the filter information is previously transmitted to the server, the mobile terminal transmits difference information between the updated filter information and the previously transmitted filter information as the filter information.

5. The e-mail reception control system according to claim 1, wherein
   the filter information includes a reception rejection address list from which receptions of all e-mails are rejected.

6. The e-mail reception control system according to claim 1, wherein
   the mobile terminal, in response to detecting a connection with a domestic network after international roaming, cancels a setting of the filter information of the server by transmitting a cancel request of the filter information with a reception request of an e-mail to the server.

7. A mobile terminal, comprising:
   a wireless transmission and reception unit that detects that it is under international roaming; and
   a control unit capable of transmitting filter information, to a server, which is set in an own terminal and is referred to for determining whether to permit or reject a reception of an e-mail to the server in response to be detected under international roaming by the wireless transmission and reception unit,
   wherein, in response to receiving an email reception notification from the server, the mobile terminal determines whether or not it is under the international roaming, and sends an email reception request to the server when it is not under the international roaming or request to apply the filter information to the server when it is under the international roaming,
   wherein the control unit, in case a destination address of an e-mail is included in the filter information when transmitting the e-mail, deletes the destination address from the filter information and transmits the updated filter information to the server, and
   wherein the control unit, in case a destination address of an e-mail is not included in the filter information when transmitting the e-mail, add the destination address to the filter information and transmits the updated filter information to the server.

8. The mobile terminal according to claim 7, wherein
   the control unit transmits the filter information to the server in response to detecting the server receives an e-mail to the mobile terminal.

9. The mobile terminal according to claim 7, wherein
   the control unit transmits the filter information to the server when the filter information is updated.

10. The mobile terminal according to claim 7, wherein
    the control unit, in case the filter information is previously transmitted to the server, transmits difference information between the updated filter information and the previously transmitted filter information as the filter information.

11. The mobile terminal according to claim 7, wherein
    the filter information includes a reception rejection address list from which receptions of all e-mails are rejected.

12. The mobile terminal according to claim 7, wherein
    the control unit, in response to detecting a connection with a domestic network after international roaming, cancels a setting of the filter information of the server by transmitting a cancel request of the filter information with a reception request of an e-mail to the server.

13. An e-mail reception control method, comprising:
    setting, to a mobile terminal, filter information which is referred to for determining whether to permit or reject a reception of an e-mail, and detecting international roaming by the mobile terminal;
    controlling a distribution of the e-mail to the mobile terminal based on the filter information in response to detecting international roaming;
    in case a destination address of an e-mail is included in the filter information when transmitting the e-mail, deleting the destination address from the filter information and transmitting the updated filter information to the server; and
    in case a destination address of an e-mail is not included in the filter information when transmitting the e-mail, adding the destination address to the filter information and transmitting the updated filter information to the server,
    wherein, in response to receiving an email reception notification from a server, the mobile terminal determines whether or not it is under the international roaming, and sends an email reception request to the server when it is not under the international roaming or request to apply the filter information to the server when it is under the international roaming.

14. The e-mail reception control method according to claim 13, further comprising:
   transmitting the filter information to the server when detecting that an e-mail to the mobile terminal is received.

15. The e-mail reception control method according to claim 13, further comprising:
   transmitting the filter information to the server when the filter information is updated.

16. The e-mail reception control method according to claim 13, further comprising:
   in case the filter information is previously transmitted to the server, transmitting difference information between the updated filter information and the previously transmitted filter information as the filter information.

17. The e-mail reception control method according to claim 13, wherein:
   the filter information includes a reception rejection address list from which receptions of all e-mails are rejected.

18. The e-mail reception control method according to claim 13, further comprising:
   in response to detecting a connection with a domestic network after international roaming, canceling a setting of the filter information of the server by transmitting a cancel request of the filter information with a reception request of an e-mail to the server.

19. A non-transitory computer readable storage medium storing a program causing a computer to perform:
   a process that detects that an own mobile terminal is under international roaming;
   a process capable of transmitting filter information, to a server, which is set in the own terminal and is referred to for determining whether to permit or reject a reception of an e-mail to the server in response to detecting international roaming;
   a process that, in case a destination address of at e-mail is included in the filter information when transmitting the e-mail, deletes the destination address from the filter information and transmits the updated filter information to the server; and
   a process that,in case a destination address of an e-mail is not included in the filter information when transmitting the e-mail, add the destination address to the filter information and transmits the updated filter information to the server,
   wherein, in response to receiving an email reception notification from the server, the mobile terminal determines whether or not it is under the international roaming, and sends an email reception request to the server when it is not under the international roaming or request to apply the filter information to the server when it is under the international roaming.

20. The storage medium according to claim 19, wherein storing a program for causing a computer to perform:
   a process that transmits the filter information to the server in response to detecting the server receives an e-mail to the own terminal.

21. The storage medium according to claim 19, wherein storing a program for causing a computer to perform:
   a process that transmits the filter information to the server when the filter information is updated.

22. The storage medium according to claim 19, wherein storing a program for causing a computer to perform:
   a process that, in case the filter information is previously transmitted to the server, transmits difference information between the updated filter information and the previously transmitted filter information as the filter information.

23. The storage medium according to claim 19, wherein:
   the filter information includes a reception rejection address list from which receptions of all e-mails are rejected.

24. The storage medium according to claim 19, wherein storing a program for causing a computer to perform:
   a process that, in response to detecting a connection with a domestic network after international roaming, cancels a setting of the filter information of the server by transmitting a cancel request of the filter information with a reception request of an e-mail to the server.

25. An e-mail reception control method, comprising:
   detecting that an own mobile terminal is under international roaming;
   transmitting filter information which is set to the own terminal and is referred to for determining whether to permit or reject a reception of an e-mail in response to detecting international roaming;
   in case a destination address of an e-mail is included in the filter information when transmitting the e-mail, deleting the destination address from the filter information and transmitting the updated filter information to the server; and
   in case a destination address of an e-mail is not included in the filter information when transmitting the e-mail, the destination address to the filter information and transmitting the updated filter information to the server,
   wherein, in response to receiving an email reception notification from a server, the mobile terminal determines whether or not it is under the international roaming, and sends an email reception request to the server when it is not under the international roaming or request to apply the filter information to the server when it is under the international roaming.

26. A mobile terminal, comprising:
   wireless transmission and reception means for detecting that it is under international roaming; and
   control means capable of transmitting filter information, to a server, which is set in an own terminal and is referred to for determining whether to permit or reject a reception of an e-mail to the server in response to be detected under international roaming by the wireless transmission and reception means,
   wherein, in response to receiving an email reception notification from the server, the mobile terminal determines whether or not it is under the international roaming, and sends an email reception request to the server when it is not under the international roaming or request to apply the filter information to the server when it is under the international roaming,
   wherein the mobile terminal, in case a destination address of an e-mail is included in the filter information when transmitting the e-mail, deletes the destination address from the filter information and transmits the updated filter information to the server, and
   wherein the mobile terminal, in case a destination address of an e-mail is not included in the filter information when transmitting the e-mail, add the destination address to the filter information and transmits the updated filter information to the server.

* * * * *